United States Patent
Kim (10) Patent No.: US 12,328,035 B2
(45) Date of Patent: Jun. 10, 2025

(54) MOTOR HAVING ROTOR STRUCTURE WITH GROOVES TO REDUCE COGGING TORQUE

(71) Applicant: LG INNOTEK CO., LTD., Seoul (KR)

(72) Inventor: Jae Young Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 311 days.

(21) Appl. No.: 17/630,428

(22) PCT Filed: Jul. 15, 2020

(86) PCT No.: PCT/KR2020/009293
§ 371 (c)(1),
(2) Date: Jan. 26, 2022

(87) PCT Pub. No.: WO2021/020772
PCT Pub. Date: Feb. 4, 2021

(65) Prior Publication Data
US 2022/0286003 A1    Sep. 8, 2022

(30) Foreign Application Priority Data
Jul. 26, 2019    (KR) .................. 10-2019-0090881

(51) Int. Cl.
*H02K 1/276* (2022.01)
(52) U.S. Cl.
CPC ......... *H02K 1/276* (2013.01); *H02K 2213/03* (2013.01)

(58) Field of Classification Search
CPC .. H02K 1/276; H02K 2213/03; H02K 1/2781; H02K 29/03; H02K 21/14; H02K 1/27; B62D 5/0403; B62D 5/04
See application file for complete search history.

(56) References Cited

U.S. PATENT DOCUMENTS

| | | |
|---|---|---|
| 8,242,654 B2 | 8/2012 | Yamada et al. |
| 2004/0217664 A1* | 11/2004 | Kuwabara ............ H02K 15/03 310/156.21 |

(Continued)

FOREIGN PATENT DOCUMENTS

| | | |
|---|---|---|
| EP | 2 615 721 A1 | 7/2013 |
| JP | 10-112945 A | 4/1998 |

(Continued)

OTHER PUBLICATIONS

JP2019083650A English translation (Year: 2024).*
WO2019069547A1 English translation (Year: 2024).*

*Primary Examiner* — Christopher M Koehler
*Assistant Examiner* — Viswanathan Subramanian
(74) *Attorney, Agent, or Firm* — Birch, Stewart, Kolasch & Birch, LLP (57) ABSTRACT

The present invention may provide a motor including a rotor and a stator disposed to correspond to the rotor, wherein the rotor includes a rotor core and a magnet disposed on the rotor core, the rotor core includes a first region in which the magnet is disposed, the first region of the rotor core includes two grooves, one of the two grooves is disposed at a position corresponding to one end region of the magnet, and the other one of the two grooves is disposed at a position corresponding to the other end region of the magnet.

13 Claims, 12 Drawing Sheets

(56) References Cited

U.S. PATENT DOCUMENTS

2010/0308680 A1    12/2010  Yamada et al.
2015/0162789 A1     6/2015  Tanaka et al.

FOREIGN PATENT DOCUMENTS

| | | |
|---|---|---|
| JP | 2004-260960 A | 9/2004 |
| JP | 2011-97752 A | 5/2011 |
| JP | 2011-103759 A | 5/2011 |
| JP | 2014-155372 A | 8/2014 |
| JP | 2014-197948 A | 10/2014 |
| JP | 2016-165185 A | 9/2016 |
| JP | 2018-043026 A1 | 3/2018 |
| JP | 2019-83650 A | 5/2019 |
| KR | 10-2018-0020030 A | 2/2018 |
| WO | WO 2019/069547 A1 | 4/2019 |

* cited by examiner

MOTOR HAVING ROTOR STRUCTURE WITH GROOVES TO REDUCE COGGING TORQUE

CROSS REFERENCE TO RELATED APPLICATIONS

This application is the National Phase of PCT International Application No. PCT/KR2020/009293, filed on Jul. 15, 2020, which claims priority under 35 U.S.C. 119 (a) to Patent Application No. 10-2019-0090881, filed in the Republic of Korea on Jul. 26, 2019, all of which are hereby expressly incorporated by reference into the present application.

TECHNICAL FIELD

The present invention relates to a motor.

BACKGROUND ART

An electric power steering (EPS) system is an apparatus which secures turning stability of a vehicle and rapidly provides a restoring force so that a driver can safely drive the vehicle. The EPS system controls a vehicle's steering shaft to be driven by driving a motor using an electronic control unit (ECU) according to driving conditions detected by a vehicle speed sensor, a torque angle sensor, a torque sensor, and the like.

The motor includes a stator and a rotor. The stator may include teeth constituting a plurality of slots, and the rotor may include a plurality of magnets facing the teeth. The adjacent teeth are disposed to be spaced apart from each other to constitute slot opens. In this case, a cogging torque may be generated due to a difference in magnetic permeability between the stator formed of a metal material and the slot open, which is an empty space, when the rotor rotates. The cogging torque affects sensitivity and output of steering, and accordingly, in order to reduce the cogging torque, grooves (notches) are formed in the tooth of the stator. However, when the grooves are formed in the tooth of the stator, due to errors in positions of the teeth, there is a problem in that deviation in position and shape between grooves occurs. In addition, since an area, in which the grooves are formed, of the tooth is limited, there is a problem of many limitations in determining the number, sizes, and shapes of the grooves.

DISCLOSURE

Technical Problem

The present invention is directed to providing a motor of which a cogging torque is reducible.

Objectives that have to be solved according to the embodiments are not limited to the above-described objectives, and other objectives which are not described above will be clearly understood by those skilled in the art from the following specification.

Technical Solution

One aspect of the present invention provides a motor including a rotor and a stator disposed to correspond to the rotor, wherein the rotor includes a rotor core and a magnet disposed on the rotor core, the rotor core includes a first region in which the magnet is disposed, the first region of the rotor core includes two grooves, one of the two grooves is disposed at a position corresponding to one end region of the magnet, and the other one of the two grooves is disposed at a position corresponding to the other end region of the magnet.

The two grooves may overlap both end regions of the magnet in a radius direction from a center of the rotor core.

Another aspect of the present invention provides a motor including a rotor, and a stator disposed to correspond to the rotor, wherein the rotor includes a rotor core and a magnet disposed on the rotor core, the rotor core includes a first rotor core and a second rotor core disposed on the first rotor core, the first rotor core includes a first region in which one part of the magnet is disposed, the second rotor core includes a second region in which another part of the magnet is disposed, one of the first region and the second region includes two grooves, and in the other one of the regions, a groove is not formed in a region corresponding to the two grooves in an axial direction.

The magnet may include a plurality of magnets, the first region may include a plurality of first regions, and the two grooves may be formed in at least two first regions among the plurality of first regions.

The number of the plurality of magnets may be the same as the number of the plurality of first regions.

A cogging torque generated due to the stator and the magnet may be 10 mNm or less.

The two grooves formed in the another of the regions may be formed so that each of the two grooves is formed at a position corresponding to one of both end regions of the magnet.

The two grooves may not overlap both end regions of the magnet in a radius direction from a center of the rotor core.

The two grooves may be symmetrically disposed with respect to a center of a width of an inner surface of the magnet in a circumferential direction. A distance between centers of the two grooves may be in the range of 10% to 30% of a length of the inner surface of the magnet.

Still another aspect of the present invention provides a motor including a rotor and a stator disposed to correspond to the rotor, wherein the rotor includes a rotor core and a magnet disposed on the rotor core, the rotor core includes a first region in which the magnet is disposed, the first region of the rotor core includes a groove, and a cogging torque generated due to the stator and the magnet is 10 mNm or less.

A width of the groove may be in the range of 6.5% to 13% of a length of an inner surface of the magnet.

A depth of the groove may be in the range of 1% to 3.5% of the length of the inner surface of the magnet.

The rotor core may include a bottom surface and a plurality of side surfaces which constitute the groove, and the bottom surface of the groove may not be in contact with the inner surface of the magnet.

The bottom surface and the plurality of side surfaces may be formed to extend in an axial direction.

Advantageous Effects

According to an embodiment, an advantageous effect of significantly reducing a cogging torque is provided by reducing magnetic fluxes at both end portions of a magnet. According to an embodiment, since a cogging torque waveform due to a partial region, in which a groove is disposed, of a rotor and a cogging torque waveform due to the other region, in which a groove is not disposed, of the rotor cancel each other, an advantageous effect of reducing the cogging torque is provided.

MODES OF THE INVENTION

Hereinafter, exemplary embodiments of the present invention will be described with reference to the accompanying drawings in detail. Purposes, specific advantages, and novel features of the invention will be made clear from the exemplary embodiments and the following detailed description in connection with the accompanying drawings. In addition, in the description of the present invention, detailed descriptions of related well-known functions, which unnecessarily obscure the gist of the invention, will be omitted.

Figure 1:
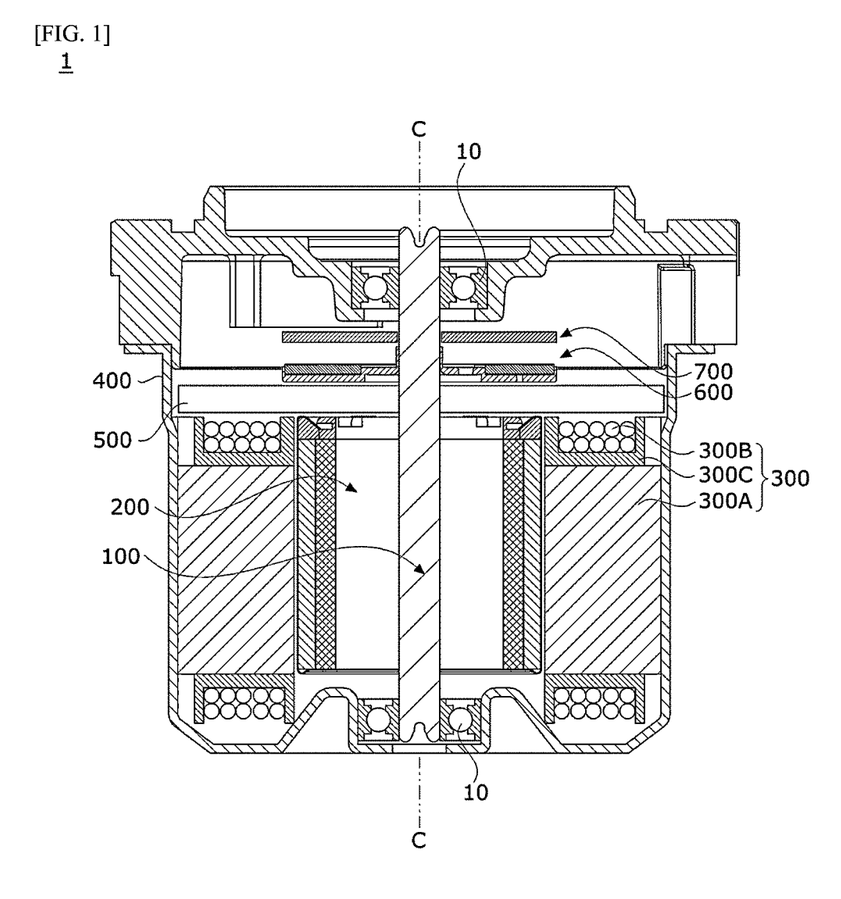
FIG. 1 is a view illustrating a motor according to an embodiment.

FIG. 1 is a view illustrating a motor according to an embodiment.

Referring to FIG. 1, a motor 1 according to the embodiment may include a shaft 100, a rotor 200, a stator 300, a housing 400, a busbar 500, a sensing unit 600, and a substrate 700. Hereinafter, the term "inside" is referred to as a direction from the housing 400 toward the shaft 100 which is a center of the motor, and the term "outside" is referred to as a direction opposite to "inside" which is the direction from the shaft 100 toward the housing 400.

The shaft 100 may be coupled to the rotor 200. When an electromagnetic interaction occurs between the rotor 200 and the stator 300 due to the supply of a current, the rotor 200 rotates, and the shaft 100 rotates in conjunction with the rotor 200. The shaft 100 is rotatably supported by bearings 10. The shaft 100 may be connected to a vehicle's steering system, and power may be transmitted to the vehicle's steering system through the shaft 100.

The rotor 200 rotates through the electrical interaction with the stator 300. The rotor 200 may be disposed inside the stator 300. The rotor 200 may include a rotor core 210 (see FIG. 2) and magnets 220 (see FIG. 2) disposed on the rotor core 210. In this case, the rotor 200 may be a surface permanent magnet (SPM) type rotor in which the magnets 220 are disposed on an outer circumferential surface of the rotor core 210.

The stator 300 is disposed outside the rotor 200. The stator 300 may include a stator core 300A, coils 300B, and an insulator 300C installed on the stator core 300A. The coil 300B may be wound around the insulator 300C. The insulator 300C is disposed between the coil 300B and the stator core 300A to serve to electrically insulate the stator core 300A from the coil 300B. The coil 300B induces an electrical interaction with the magnets 220 (see FIG. 2).

The busbar 500 is disposed on the stator 300. The busbar 500 includes a busbar holder (not shown) formed of an insulating material and a plurality of terminals (not shown) coupled to the busbar holder. In this case, the busbar holder is formed of an insulating material to prevent the plurality of terminals from being connected to each other. In addition, the plurality of terminals serve to connect the coils 300B wound around the stator core 300A to apply a current to the coils.

The sensing unit 600 may be coupled to the shaft 100. The sensing unit 600 includes a sensing plate (not shown) and a sensing magnet (not shown) disposed on the sensing plate.

A sensor, which detects a magnetic force of the sensing magnet (not shown), may be disposed on the substrate 700. In this case, the sensor may be a Hall integrated circuit (IC) and serve to detect a magnetic flux of the sensing magnet of the sensing unit 600 coupled to the shaft 100. The sensing unit 600 and the substrate 700 serve to detect a position of the rotor 200 by detecting the magnetic flux changed according to rotation.

Figure 2:
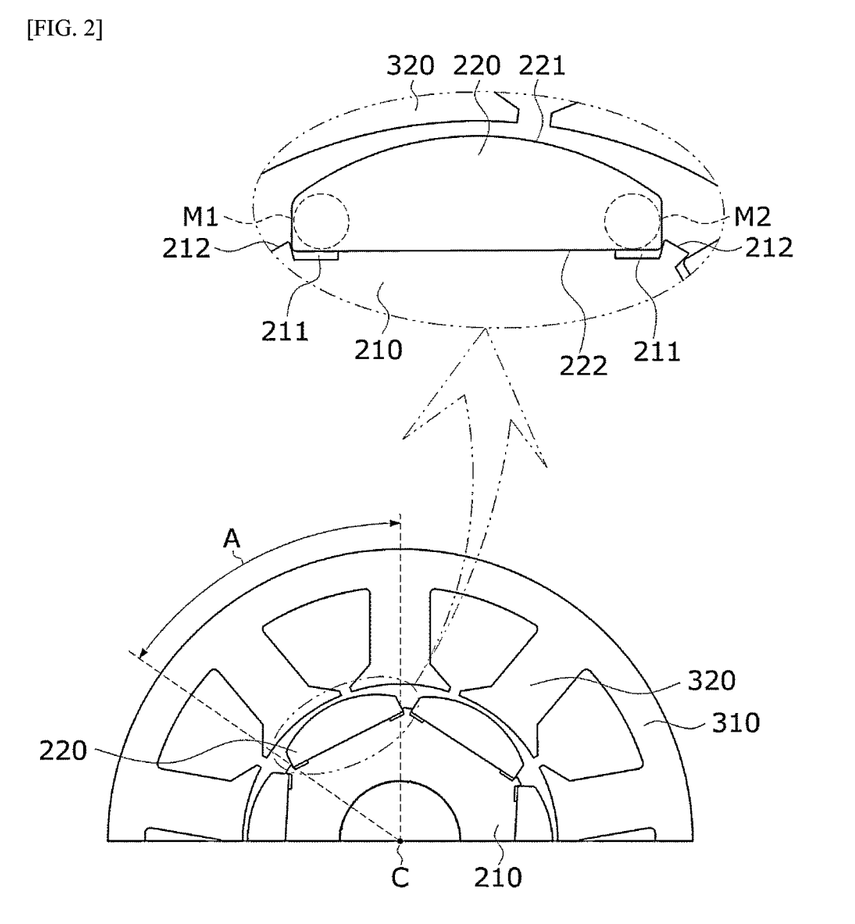
FIG. 2 is an enlarged view illustrating a rotor core on which a first type magnet and a groove are disposed.

FIG. 2 is an enlarged view illustrating a rotor core on which a first type magnet 220 and a groove are disposed.

Referring to FIG. 2, the stator core 300A may include a yoke 310 and a tooth 320. The tooth 320 may protrude from an inner circumferential surface of the yoke 310. The tooth 320 may include a plurality of teeth 320. The number of the teeth 320 may be variously changed according to the number of magnets 220. The stator core 300A may be formed by combining a plurality of divided cores each including the yoke 310 and the teeth 320.

A cogging torque is generated as a wave having an amplitude and a frequency, and a cogging main degree is the number of vibration times of a cogging torque waveform per unit rotation (one rotation) of a motor. When the cogging main degree increases, since the number of the vibration times of the cogging torque waveform also increases, the cogging torque may be significantly reduced. The cogging main degree may be determined by the number of the magnets 220 and the number of the teeth 320. When the cogging main degree increases, the cogging torque may be reduced, but since the number of the magnets 220 and the number of the teeth 320 are fixed, the cogging main degree is also fixed.

However, in the motor 1 according to the embodiment, the cogging torque may be reduced using two methods. In one method, a shape of the rotor core 210 is changed (using a groove) to increase a cogging main degree so as to increase a frequency so that a magnitude of a cogging torque is reduced. In the other method, a region in which a shape of the rotor core 210 is changed (using a groove) and a region in which the shape thereof is not changed are combined to induce interference between a cogging torque waveform with a normal phase and a cogging torque waveform with a reverse phase so as to reduce a magnitude of a cogging torque.

The rotor core 210 includes a first region in which the magnet 220 is disposed. The first region is a region, on which the magnet 220 is seated or coupled thereto, of an outer surface of the rotor core 210.

In FIG. 2, a first region A of the rotor core 210 may have a flat surface. For example, a cross section of the rotor core 210 perpendicular to a longitudinal direction of the shaft 100 may have a polygonal shape. The first region A is an outer surface, which is disposed in an axial direction, of an outer surface of the rotor core 210, and when the rotor core 210 includes guide protrusions 212, the first region A may be a region between the guide protrusions 212 in a circumferential direction. When the rotor core 210 does not include the guide protrusions 212, the first region A may be a region between angled corners of the rotor core 210 in the circumferential direction.

The first type magnet 220 may have a shape including an outer surface 221 having a curved shape and an inner surface 222 having a flat shape corresponding to the rotor core 210. The outer surface 221 of the magnet 220 is a surface facing the tooth 320 of the stator 300, and the inner surface 222 is a surface facing the rotor core 210 of the magnet 220. The outer surface 221 of the magnet 220 may have a shape of which a vicinity of a center protrudes further than both end portions thereof in the circumferential direction from the inner surface 222 of the magnet 220, and a curvature of the vicinity of the center of the curved-shaped outer surface 221 may be smaller than or equal to curvatures of the both end portions thereof.

Figure 3:
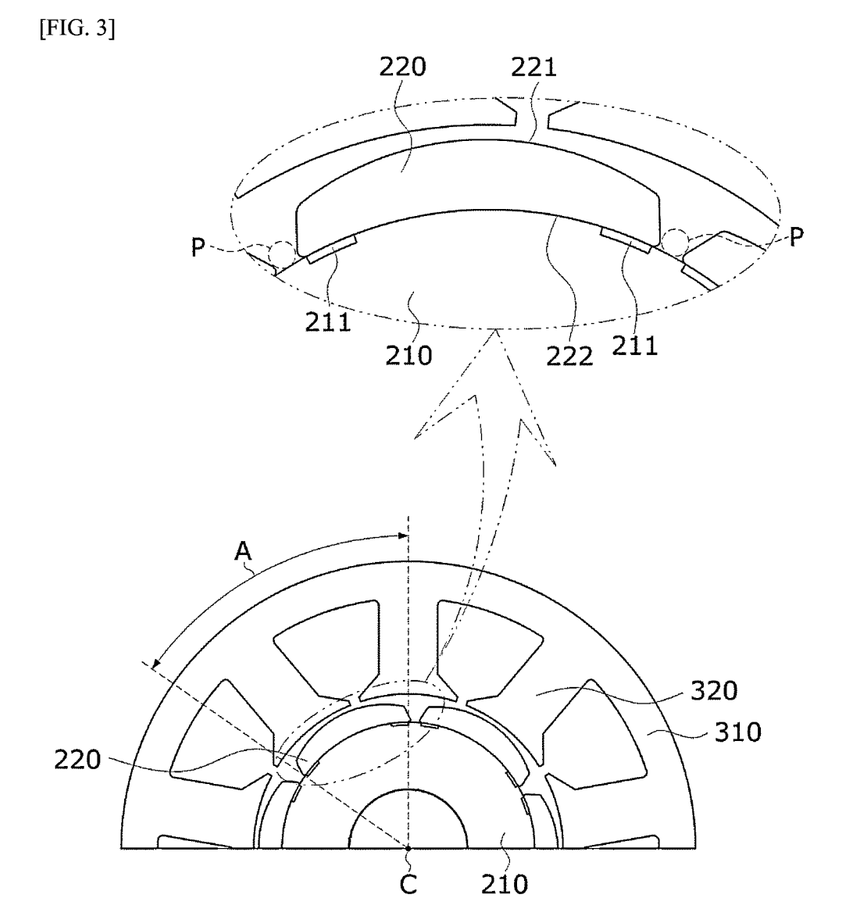
FIG. 3 is an enlarged view illustrating a rotor core on which a second type magnet and a groove are disposed.

FIG. 3 is an enlarged view illustrating a rotor core on which a second type magnet 220 and a groove are disposed.

In FIG. 3, a first region A of a rotor core 210 may have a curved surface. For example, a cross section of the rotor core 210 perpendicular to the longitudinal direction of the shaft 100 may have a circular shape. The first region A is an outer surface, which is disposed in the axial direction, of an outer surface of the rotor core 210, and when the rotor core 210 includes guide protrusions 212, the first region A is a region between the guide protrusions 212 in the circumferential direction. When the rotor core 210 does not include the guide protrusions 212 like portions P of FIG. 3, the first region A may be an outer circumferential surface of the rotor core 210 corresponding to an inner surface 222 of the magnet 220 in the circumferential direction.

The second type magnet 220 may have an outer surface 221 and the inner surface 222 each having a curved shape corresponding to the rotor core 210. In the shape of the magnet 220, for example, a curvature radius of the inner surface 222 may be greater than a curvature radius of the outer surface 221. In this case, a curvature of the curved-shaped inner surface 222 may be constant along an outer circumferential surface of the first region A of the rotor core 210, and a curvature of a vicinity of a center of the curved-shaped outer surface 221 may be less than or equal to a curvature of each of both end portions thereof.

Referring to FIGS. 2 and 3, two grooves 211 may be disposed in the first region A of the rotor core 210. Any one of two grooves 211 may be disposed at a position corresponding to one end region M1 of the magnet 220. The other one of two grooves 211 may be disposed at a position corresponding to the other end region M2 of the magnet 220.

That is, one end region M1 and the other end region M2 of the magnet 220 may be both side surfaces of the magnet 220 or may be portions adjacent to the guide protrusions 212 when the rotor core 210 includes the guide protrusions 212. For example, in a radius direction from a center C of the rotor core 210, any one of two grooves 211 may be disposed to overlap one end region M1, and the other one of two grooves 211 may be disposed to overlap the other end region M2.

A plurality of first regions A may be disposed. The number of the magnets 220 may be the same as the number of the first regions A. Two grooves 211 may be formed in at least two first regions A among the plurality of first regions A.

Figure 4:
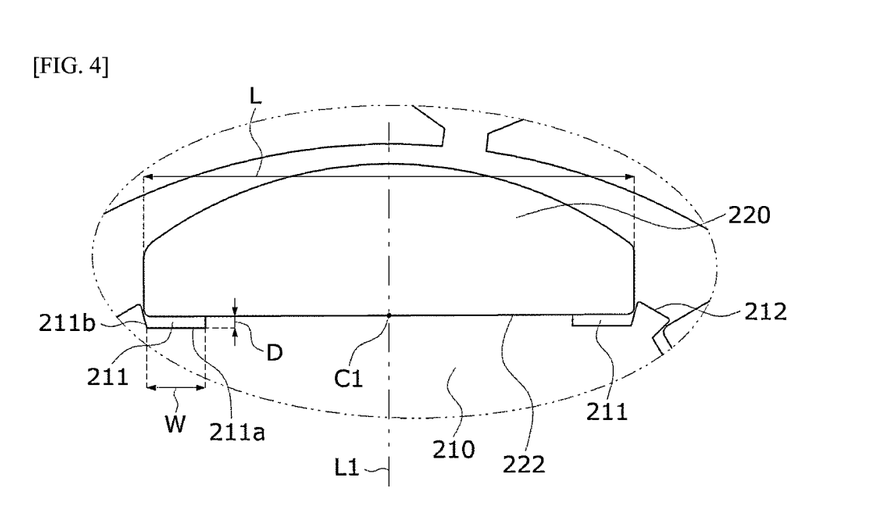
FIG. 4 is an enlarged view illustrating the magnet and the groove illustrated in FIG. 2.

FIG. 4 is an enlarged view illustrating the magnet 220 and the groove 211 illustrated in FIG. 2.

Referring to FIG. 4, two grooves 211 may be symmetrically disposed with respect to a reference line L1 passing through a center C1 of a width, which is based on the circumferential direction, of the inner surface 222 of the magnet 220.

The rotor core 210 may include a bottom surface 211a and a plurality of side surface 211b which constitute the groove 211. In this case, the bottom surface 211a is not in contact with the inner surface 222 of the magnet 220. The bottom surface 211a and the side surfaces 211b may be formed to extend in the axial direction. In addition, in the groove 211 of the rotor core 220 corresponding to one end region M1 of the magnet 220, one side surface of the magnet 220 may be aligned with one of the plurality of side surfaces 211b constituting the groove 211, and in the groove 211 of the rotor core 220 corresponding to the other end region M2, the other side surface of the magnet 220 may be aligned with one of the plurality of side surfaces 211b constituting the groove 211.

Two grooves 211 constitute air gaps between the magnet 220 and the rotor core 210 at both end regions M1 and M2 of the magnet 220. Thus, a magnitude of a magnetic flux may be reduced at each of both end regions M1 and M2 of the magnet 220 to reduce a cogging torque. In addition, since the groove 211 is disposed in the outer surface of the rotor core 210 having an area which is relatively greater than an area of the tooth 320 of the stator 300, there advantages in that a design of the groove 211 is facilitated and dimensional accuracy of the groove 211 is high.

Figure 5:
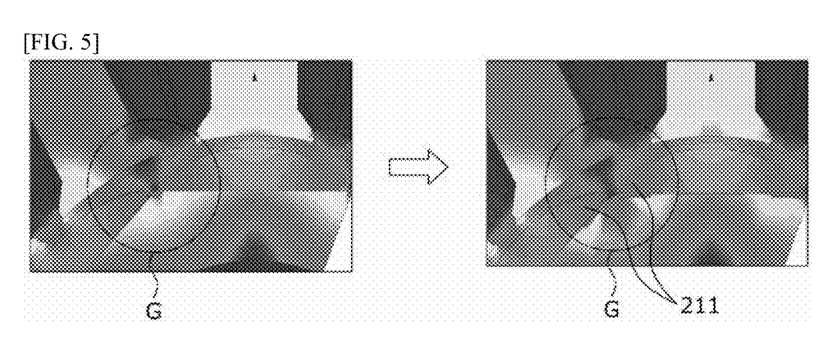
FIG. 5 is a picture showing a magnitude of a magnetic flux around both end regions of magnets of a comparative example and a magnitude of a magnetic flux around both end regions of magnets of an example.

FIG. 5 is a picture showing a magnitude of a magnetic flux around both end regions of magnets of a comparative example and a magnitude of a magnetic flux around both end regions M1 and M2 of the magnets 220 of an example.

A left picture of FIG. 5 shows the magnitude of the magnetic flux of the comparative example which does not have a groove.

A right picture of FIG. 5 shows the magnitude of the magnetic flux of the example having the groove 211.

A portion G of FIG. 5 is a vicinity of both end regions M1 and M2 of the magnets 220. Based on the portion G of FIG. 5, it may be seen that the magnitude of the magnetic flux of the example shown in the right picture of FIG. 5 is significantly reduced when compared to the magnitude of the magnetic flux of the comparative example shown in the left picture of FIG. 5. This is due to the air gaps, which are formed by the grooves 211, between the magnets 220 and the rotor core 210.

The cogging torque is greatly generated due to magnetic influence of both end regions M1 and M2 of the magnet 220 and the stator tooth 320, but when the magnitude of the magnetic flux of both end regions M1 and M2 of the magnets 220 is reduced as described, the magnetic influence is reduced, and accordingly, the cogging torque may be significantly reduced.

Figure 6:
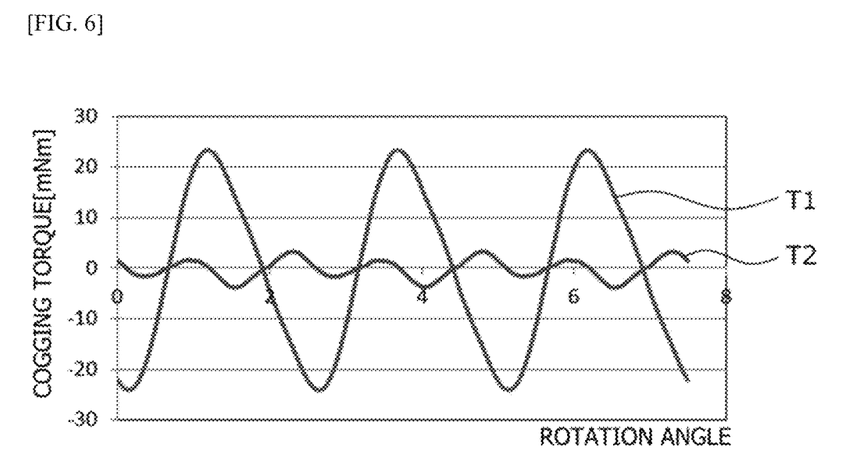
FIG. 6 is a graph showing a first cogging torque waveform of the comparative example and a second cogging torque waveform of the example.

FIG. 6 is a graph showing a first cogging torque waveform of the comparative example and a second cogging torque waveform of the example.

Referring to FIG. 6, it may be seen that a magnitude of a cogging torque of a first cogging torque waveform T1 of the comparative example, which does not have the groove 211, is 44 mNm, but a magnitude of a cogging torque of a second cogging torque waveform T2 of the example, in which the groove 211 is disposed, is 8 mNm which is reduced by 82% of the cogging torque measured in the comparative example.

Figure 7:
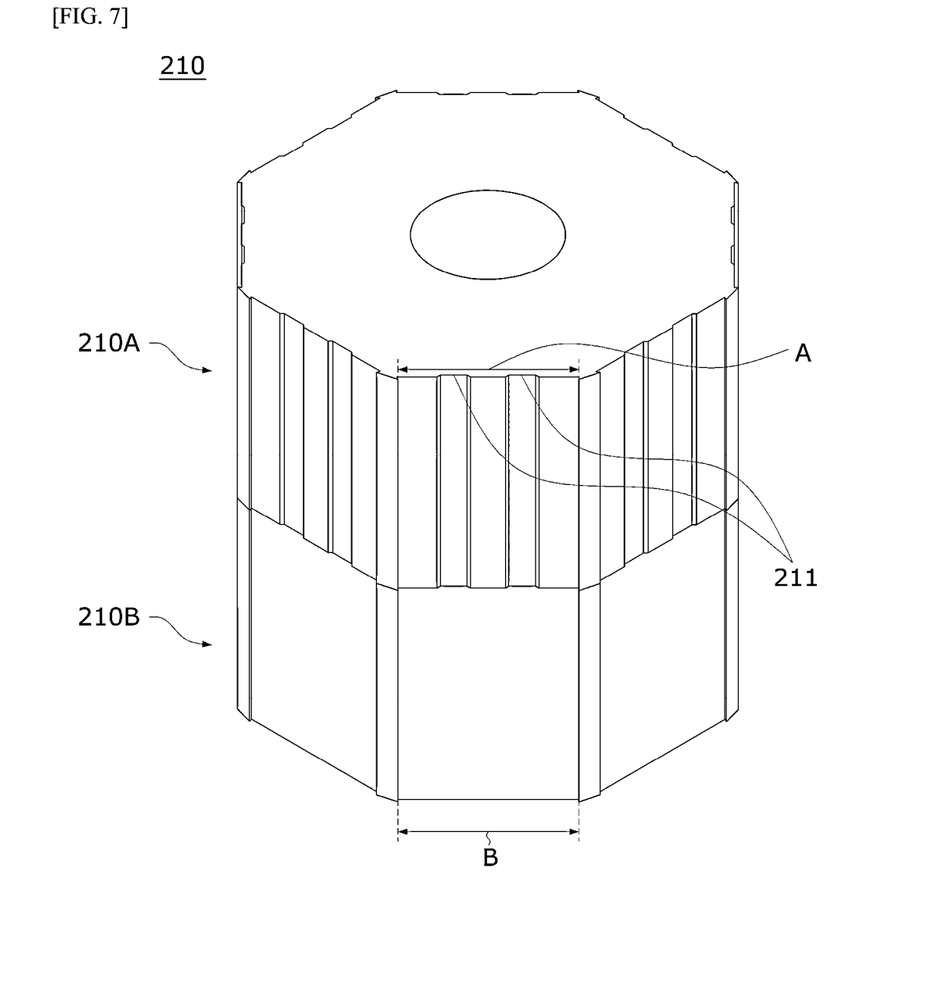
FIG. 7 is a view illustrating a rotor core including a first rotor core and a second rotor core.
Figure 8:
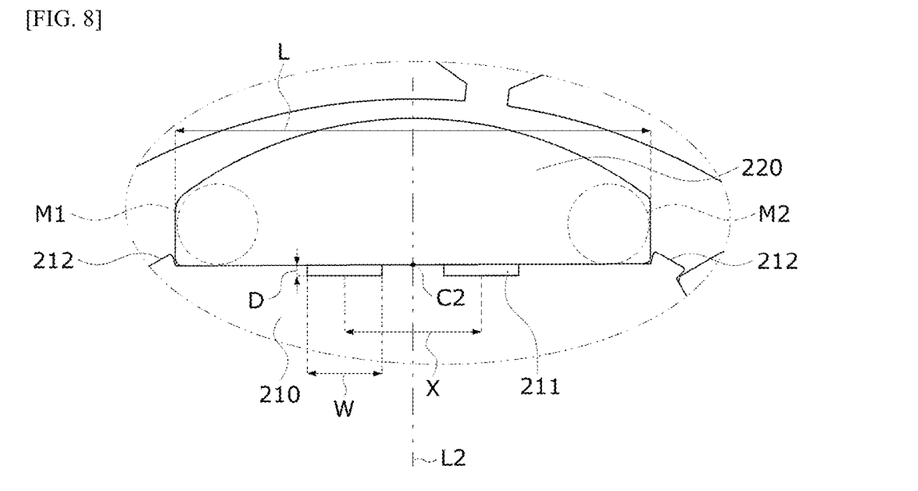
FIG. 8 is an enlarged view illustrating a groove disposed in the rotor core illustrated in FIG. 7.

FIG. 7 is a view illustrating a rotor core 210 including a first rotor core 210A and a second rotor core 210B, and FIG. 8 is an enlarged view illustrating grooves 211 disposed in the first rotor core 210A illustrated in FIG. 7.

Referring to FIG. 7, the rotor core 210 may include the first rotor core 210A and the second rotor core 210B. The first rotor core 210A and the second rotor core 210B are to reduce a magnitude of a cogging torque by inducing interference between a cogging torque waveform with a normal phase and a cogging torque waveform with a reverse phase.

The first rotor core 210A and the second rotor core 210B may be coaxially stacked in the axial direction.

The first rotor core 210A may include a first region A in which a part of a magnet 220 is disposed.

The second rotor core 210B may include a second region B in which a part of the magnet 220 is disposed.

Two grooves 211 may be disposed in the first region A. In the second region B, the grooves 211 may not be disposed in a region corresponding to two grooves 211 formed in the first region A in the axial direction.

Two grooves 211 may be disposed at positions which do not correspond to both end regions M1 and M2 of the magnet 220. For example, in the radius direction based on the center C of the rotor core 210, two grooves 211 may be disposed not to overlap both end regions M1 and M2 of the magnet 220.

Two grooves 211 may be symmetrically disposed with respect to a reference line L2 passing through a center C2 of a width of an inner surface 222 of the magnet 220 in the circumferential direction.

Figure 9:
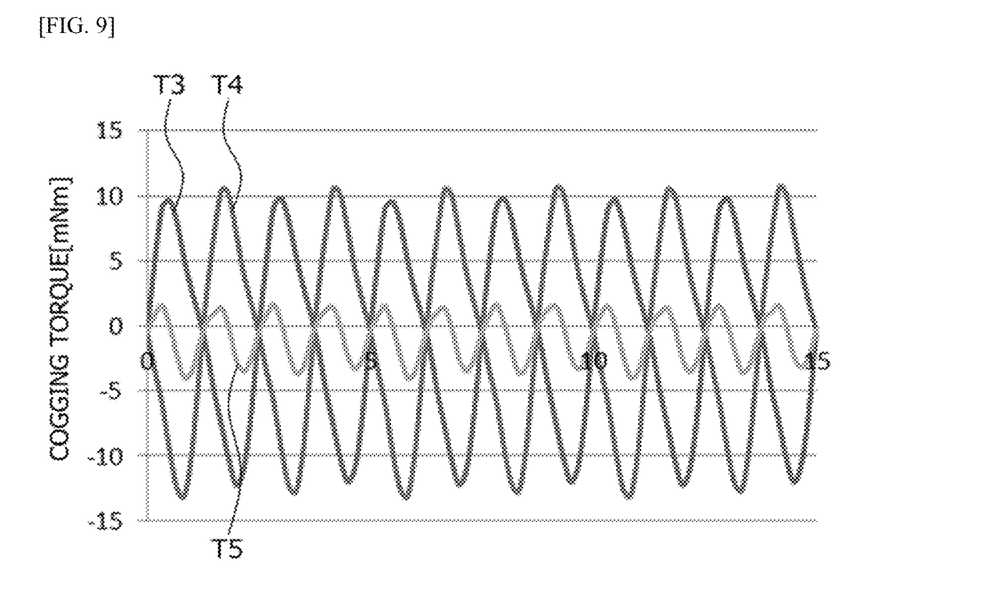
FIG. 9 is a graph showing a third cogging torque waveform generated due to a first region, a fourth cogging torque waveform generated due to a second region, and a fifth cogging torque waveform generated due to cancellation between the third cogging torque waveform and the fourth cogging torque waveform.

FIG. 9 is a graph showing a third cogging torque waveform T3 generated due to the first rotor core 210A having the first region A, a fourth cogging torque waveform T4 generated due to the second rotor core 210B having the second region B, and a fifth cogging torque waveform generated due to cancellation between the third cogging torque waveform and the fourth cogging torque waveform.

A phase of the third cogging torque waveform T3 and a phase of the fourth cogging torque waveform T4 are opposite to each other. Accordingly, the rotor core 210, in which the first rotor core 210A and the second rotor core 210B are stacked in the axial direction, generates the fifth cogging torque waveform T5 generated due to interference between the third cogging torque waveform T3 generated due to the first rotor core 210A and the fourth cogging torque waveform T4 generated due to the second rotor core 210B.

In the fifth cogging torque waveform T5, it may be seen that the cogging torque is significantly reduced.

Figure 10:
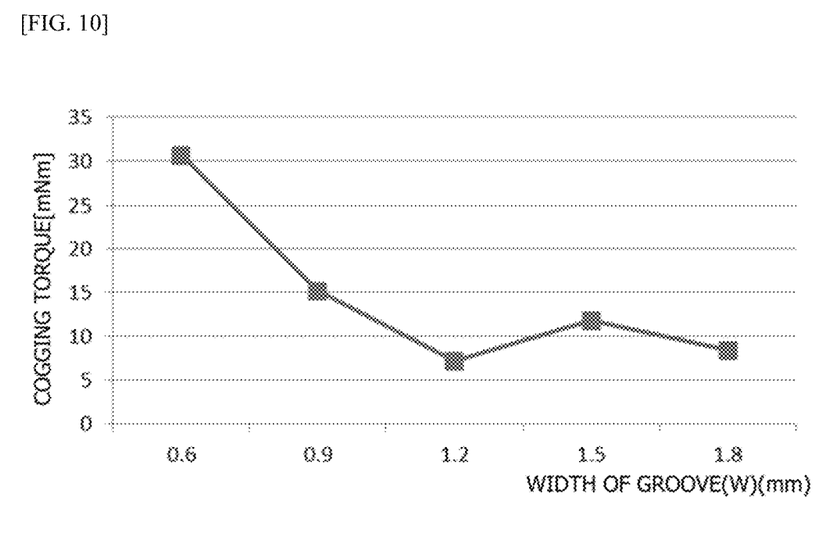
FIG. 10 is a graph showing a cogging torque according to a width of the groove.
Figure 11:
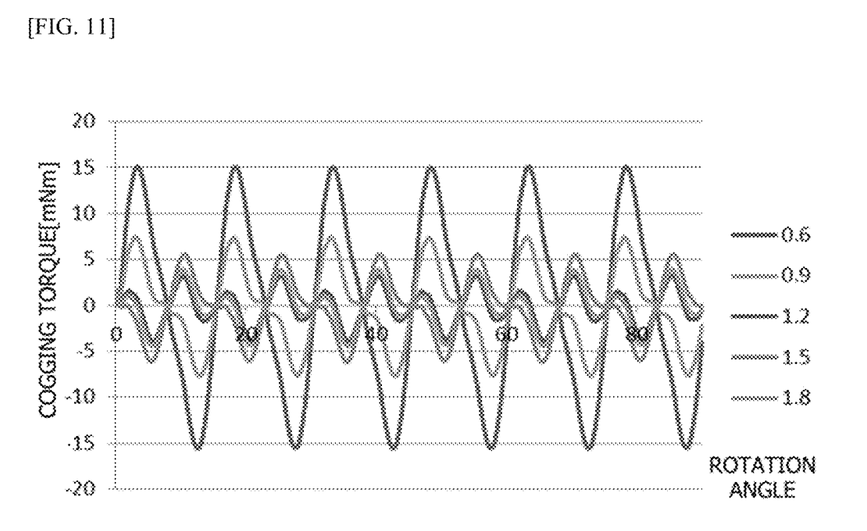
FIG. 11 is a graph showing a cogging torque waveform according to the width of the groove.

FIG. 10 is a graph showing a magnitude of a cogging torque according to a width W of the groove 211, and FIG. 11 is a graph showing a cogging torque waveform according to the width W of the groove 211.

Referring to FIGS. 4, 10, and 11, in a section in which the width W of the groove 211 is in the range of 6.5% to 13% of a length L of the inner surface 222 of the magnet 220 (hereinafter, referred to as a "section 1"), a measured cogging torque is lower than a reference cogging torque. For example, when the length L of the inner surface 222 of the magnet 220 is 14 mm, and the width W of the groove 211 is in the range of 0.9 to 1.8 mm, it may be seen that the measured cogging torque is lower than the reference cogging torque. The reference cogging torque may have a reference value of a cogging torque desired in a product. For example, the reference cogging torque may be 15 mNm. In this case, the width W of the groove 211 may be a width of the bottom surface 211a.

In a section in which the width W of the groove 211 is in the range of 7.5% to 10% of the length L of the inner surface 222 of the magnet 220 (hereinafter, referred to as a "section 2"), an effect of reducing a measured cogging torque is higher than that in the section 1. For example, when the length L of the inner surface 222 of the magnet 220 is 14 mm, and the width W of the groove 211 is in the range of 1.05 mm to 1.4 mm, it is seen that an effect of reducing a measured cogging torque is higher than that in the section 1.

When the width W of the groove 211 is 8.0% of the length L of the inner surface 222 of the magnet 220, for example, when the width W of the groove 211 is 1.2 mm, the cogging torque is 10 mNm or less, and it is seen that an effect of reducing a cogging torque is the highest among those in the section 1 and the section 2.

Figure 12:
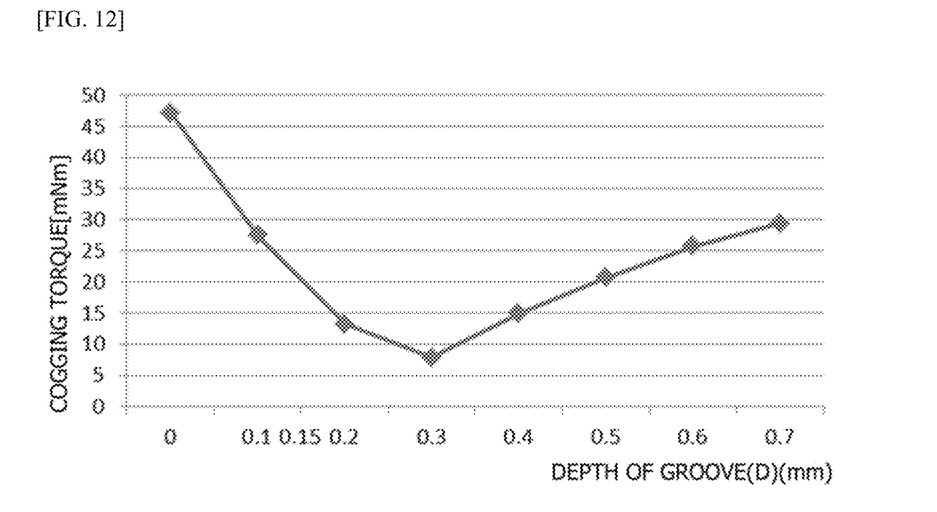
FIG. 12 is a graph showing a cogging torque according to a depth of the groove.
Figure 13:
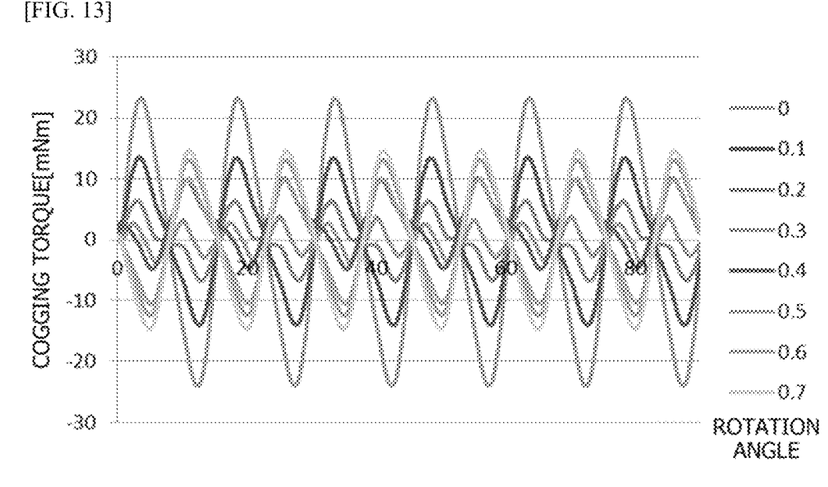
FIG. 13 is a graph showing a cogging torque waveform according to the depth of the groove.

FIG. 12 is a graph showing a cogging torque according to a depth D of the groove 211, and FIG. 13 is a graph showing a cogging torque waveform according to the depth D of the groove 211. Referring to FIGS. 4, 12, and 13, in a section in which the depth D of the groove 211 is 1% to 3.5% of the length L of the inner surface 222 of the magnet 220 (hereinafter, referred to as a "section 3"), a measured cogging torque is lower than the reference cogging torque (for example, 20 mNm). For example, when the length L of the inner surface 222 of the magnet 220 is 14 mm and the depth of the groove 211 is in the range of 0.15 to 0.5 mm, it may be seen that a measured cogging torque is lower than the reference cogging torque. In this case, the depth D of the groove 211 may be a length of the side surface 211b in the radius direction.

In a section in which the depth of the groove 211 is in the range of 1.4% to 2.8% of the length L of the inner surface 222 of the magnet 220 (hereinafter, referred to as a "section 4"), it is seen that an effect of reducing a measured cogging torque is higher than that in the section 3. For example, when the length L of the inner surface 222 of the magnet 220 is 14 mm and the width W of the groove 211 is in the range of 0.2 mm to 0.39 mm, an effect of reducing a cogging torque is higher than that in the section 3.

When the depth of the groove 211 is 2.1% of the length L of the inner surface 222 of the magnet 220, for example, when the depth of the groove 211 is 0.3 mm, the cogging torque is 10 mNm or less, and it is seen that an effect of reducing a cogging torque is highest in comparison to those in the section 3 and the section 4.

Meanwhile, when a separation distance X (see FIG. 8) between two grooves 211 disposed in the first region A is in the range of 10% to 30% of the length L of the magnet 220 of the inner surface 222, a cogging torque is significantly reduced. A reference point of the separation distance X (see FIG. 8) may be a center of the width of the groove 211.

Particularly, when the separation distance X between two grooves 211 disposed in the first region A is 20% of the length L of the inner surface 222 of the magnet 220, an effect of reducing a cogging torque is highest.

As described above, the motor according to one exemplary embodiment of the present invention has been specifically described with reference to the accompanying drawings.

The above description is only an example describing a technological scope of the present invention. Various changes, modifications, and replacements may be made by those skilled in the art without departing from the spirit and scope of the present invention. Therefore, the embodiments disclosed above and in the accompanying drawings should be considered in a descriptive sense only and not for limiting the technological scope. The technological scope of the present invention is not limited by the embodiments and the accompanying drawings. The scope of the present invention should be interpreted by the appended claims and encompass all equivalents falling within the scope of the appended claims.

The invention claimed is:

1. A motor comprising:
a rotor; and
a stator disposed to correspond to the rotor,
wherein the rotor includes a rotor core and a magnet disposed on the rotor core,
wherein the rotor core includes a first rotor core and a second rotor core, the first rotor core and the second rotor core being coaxially stacked in an axial direction,
wherein the first rotor core includes a first region in which one part of the magnet is disposed,
wherein the second rotor core includes a second region in which another part of the magnet is disposed,
wherein the first region includes two grooves, the two grooves being disposed on an outer surface of the first rotor core and being symmetrically disposed with respect to a center of a width of an inner surface of the magnet in a circumferential direction,
wherein the second region does not include a groove,
wherein the first region and the second region are located adjacent to each other in the axial direction,
wherein the two grooves are disposed on the outer surface of the first rotor core, the two grooves being symmetrically disposed with respect to the center of the width of the inner surface of the magnet in the circumferential direction,
wherein the two grooves are disposed to an axial end of the first rotor core, and
wherein a cogging torque waveform generated by the first rotor core and a cogging torque waveform generated by the second rotor core are opposite in phase.

2. The motor of claim 1, wherein the magnet includes a plurality of magnets, and
wherein the two grooves are formed in at least two first regions among a plurality of first regions.

3. The motor of claim 2, wherein a number of the plurality of magnets is the same as a number of the plurality of first regions.

4. The motor of claim 2, wherein a cogging torque generated due to the stator and the magnet is 10 mNm or less.

5. The motor of claim 2, wherein an outer surface of each of the magnets have a shape of which a vicinity of a center protrudes further than both end portions of each magnet in the circumferential direction.

6. The motor of claim 1, wherein a cogging torque generated due to the stator and the magnet is 10 mNm or less.

7. The motor of claim 1, wherein the two grooves disposed in the first region are formed so that each of the two grooves is disposed at a position corresponding to one of both end regions of the magnet.

8. The motor of claim 1, wherein the two grooves do not overlap both end regions of the magnet in a radius direction from a center of the rotor core.

9. The motor of claim 1, wherein a distance between centers of the two grooves is in a range of 10% to 30% of a length of the inner surface of the magnet.

10. The motor of claim 1, wherein a width of each of the two grooves is in a range of 6.5% to 13% of a length of the inner surface of the magnet.

11. The motor of claim 10, wherein a depth of each of the two grooves is in a range of 1% to 3.5% of the length of the inner surface of the magnet.

12. The motor of claim 1, wherein the rotor core includes a bottom surface and a plurality of side surfaces which include the two grooves, and
wherein the bottom surface of each groove is not in contact with the inner surface of the magnet.

13. The motor of claim 12, wherein the bottom surface and the plurality of side surfaces are formed to extend in the axial direction.

* * * * *